April 9, 1935. W. D. GOVE 1,996,805
CONTROL FOR INDEFINITELY VARIABLE TRANSMISSION
Filed Dec. 12, 1932
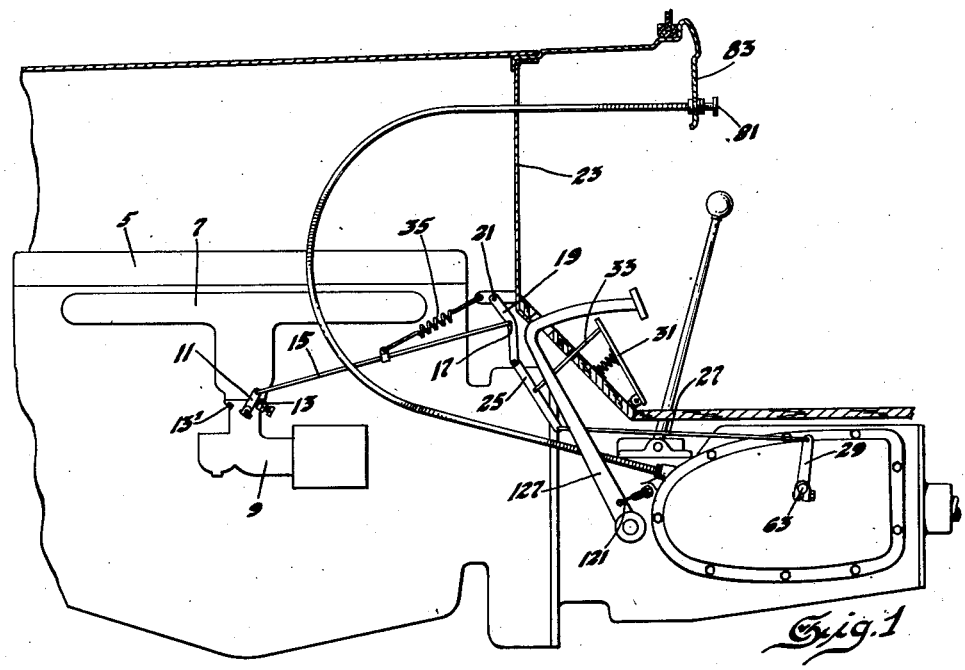
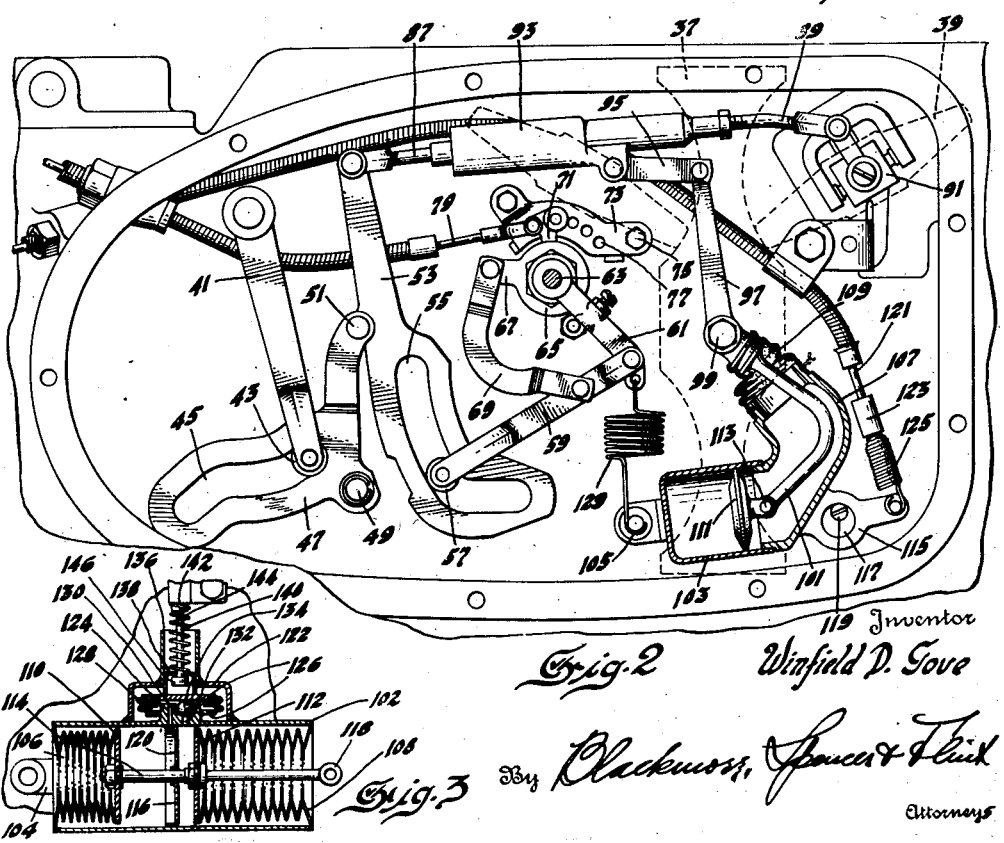

Patented Apr. 9, 1935

1,996,805

UNITED STATES PATENT OFFICE 1,996,805

CONTROL FOR INFINITELY VARIABLE TRANSMISSION

Winfield D. Gove, Flint, Mich., assignor, by mesne assignments, to General Motors Corporation, Detroit, Mich., a corporation of Delaware Application December 12, 1932, Serial No. 646,758

6 Claims. (Cl. 74—336.5)

This invention relates to control mechanism for power transmission means for vehicles and has been designed for an infinitely variable transmission, particularly one of the friction roller type.

In transmission devices of this kind it has been proposed to employ a movable member to shift the position of the rollers relative to the driving and driven discs; to employ an arm rotatable by a governor responsive to the driving or driven shafts, preferably the former, and to make use of linkage between the governor actuated arm and the roller shifting member to change the driving ratio.

My invention has for its object an improvement in such linkage which consists in the use of cam means between the governor actuated arm and the shifting member.

More specifically the cam means employs a swinging member having a fixed pivot, said swinging member constructed to be engaged and rotated by the governor actuating arm through the instrumentality of a camming surface on the swinging member, and a differential lever which latter is operably connected to the ratio shifting member.

In such transmissions it is also known to employ dashpot devices to check the rate of shifting. My invention provides an improved sealed dashpot operated by a pivoted arm articulated to a short piston, which latter has a spherical contour in contact with the dashpot cylinder. The articulating points are chosen to give minimum motion to a sealing boot and to provide a minimum change in the inside volume of the dashpot due to the motion of the piston. It is also within the scope of the invention to employ a dashpot construction having a sealing metal bellows. It is also a part of the invention to employ a liquid such as kerosene which shall have small change in viscosity with changes in temperature.

Other objects and advantages will be understood from the following description.

Fig. 1 is a view in side elevation of the motor and transmission of a motor vehicle, my control mechanism being associated therewith.

Fig. 2 is a view in side elevation of the control mechanism mounted on the wall of the transmission housing with cover removed.

Fig. 3 is a view in longitudinal section of a modified form of dashpot control.

Referring by reference characters to the drawing, numeral 5 represents the engine of a motor vehicle, 7 the intake manifold, 9 the carburetor, and 11 the throttle valve arm which is to engage stops 13 and 13' in its idling and full open positions respectively. The throttle lever is connected by a rod 15 to a mid portion 17 of a lever 19 pivoted at 21 to the dash 23. A differential lever 25 is pivoted at one end to the free end of lever 19. Its other end is connected by a link 27 to a lever arm 29 which is movable in a counterclockwise direction in changing the driving ratio to low speed as will be explained below. The accelerator pedal 31 is connected by a link 33 to a mid point of lever 25. A spring 35 anchored at one end and connected to link 15 at the other operates to hold the throttle in its idling position.

The engine functions to drive the vehicle through change speed mechanism including, in the illustrated embodiment, discs (driving and driven) one of which is shown at 37 and rollers such as 39. An input shaft governor (not shown) rocks an arm 41 in a clockwise direction as the speed of the shaft increases. A roller 43 on the end of arm 41 moves in a cam slot 45 of a swinging member 47, rotating on a fixed pivot 49. At 51 on lever 47 is the pivot of a differential lever 53. This lever has a slot 55 within which is a roller 57 on the end of a link 59, the latter pivoted on the end of a lever arm 61 carried by shaft 63, this being the shaft to which is secured arm 29 referred to above. Rotatable about the axis of shaft 63 is a hub 65 having an arm 67 connected by a link 69 to the arm 59. Hub 65 has another arm 71. A plate 73 is fixedly secured in position by fastening means 75, and has openings 77 to be engaged by a suitable spring detent carried by arm 71. A cable 79 is connected to arm 71 and terminates in a button 81 preferably on the instrument panel 83. By this means operation of the button rotates the hub 65 which, through the instrumentality of link 69, swings the link 59, its end moving in slot 55, thus changing the leverage whereby the governor arm 41 rocks the differential lever 53. Also, the accelerator pedal 31, after having opened the throttle to its maximum position, may rock lever 25 and through the link 27 also rock lever arm 29. Such rocking of 29 actuates the differential lever 53 through the link 59, turning the differential lever about its pivot 51 with the swinging member 47. This last described movement of the differential lever through the depression of the accelerator pedal operates to shift the gear ratio toward low speed as will be explained.

The rollers 39 are rocked by movements of the lever 53. These movements of lever 53 may be occasioned by the governor actuated arm 41 or by the swinging of arm 61 through the instrumentality of the accelerator pedal as explained above. The differential lever 53 performs the shifting movement by means of a rod 87 attached to the lever 53; a rod 89 attached to mechanism generally indicated as 91 operably connected to the friction roller system, and yielding means between said parts 87 and 89 not shown but enclosed in housing 93 which is attached to part 89.

Pivoted to the housing 93 is a link 95 terminally pivoted to a double arm lever 97 rotatable about a fixed pivot 99. The work arm of lever 97 is curved as shown by numeral 101. It enters a dashpot constituted by a casing 103 pivoted at 105 and also including an arcuate neck portion 107 secured thereto. A sealing boot 109 connects the lever 97 to the opening of part 107. The piston 111 has a spherical contour and is preferably provided with a restricted passage extending therethrough. It is pivoted at 113 to the aforesaid lever arm 101. The part 107 has a lug 115 provided with an opening 117. A stop pin 119 extends through the opening 117 and limits the swinging of the dashpot about its pivot 105. A cable 121 is connected by a coupling 123 with a spring 125 which spring is attached to the lug 115. This cable is preferably attached at its other end to the brake pedal 127 to the end that the application of the brake may rock the dashpot casing relative to its piston, thereby permitting the flow of fluid around the periphery of the piston and prevent the effect of the dashpot in retarding the shift to low speed when the brake is applied to stop the vehicle. The points of articulation associated with the dashpot are such as to permit its action without materially flexing the sealing boot and to prevent any considerable change in the cubical contents within the dashpot. The spring 125 is provided in the linkage in order that the brake pedal 127 may be further depressed after the dashpot has moved sufficiently to engage the stop 119.

Spring 129 is anchored on pivot pin 105 and is attached to the end of lever 61. This spring is of such strength relative to spring 35 that it offers sufficient resistance to the rotation of lever 25 through the link 27 to ensure that the throttle may be opened to its widest position before the accelerator pedal operates to rock the differential lever. It will be understood that this rocking of the differential lever is such as to tend to force the driving ratio toward low speed position and thereby secure maximum acceleration with the engine at full throttle.

In Fig. 3 is shown another form of dashpot. In this form a cylinder 102 is pivotally anchored by a lug 104. Bellows preferably of metal and marked 106 and 108 are connected to the otherwise open ends of cylinder 102. Discs or heads 110 and 112 are connected to the inner ends of the bellows. A rod 114 is connected to these heads, and extends through an intermediate partition 116. One end 118 of the rod 114 is connected to a suitable mechanism (not shown) such as a lever 97 attached to a connecting link such as 95 of Fig. 2, which link is pivotally attached to the cylinder 93 as before explained. Partition 116 has one or more restricted openings 120 whereby the shifting of the rollers to change ratios is retarded. A cover 122 of cup shape encloses a boss 124 provided on the wall of the cylinder adjacent the partition. A disc 126 overlies the boss within the cover 122 and is connected to the boss by a bellows 128. Two passages 130 and 132 extend through the boss and connect the chamber within the bellows with opposite sides of the partition. One of these passages is closed by a spherical closure member 134 which is engaged by the disc 126. Welded to the cover 122 is a sleeve 136 within which slides a cup 138 backed by a spring 140 which engages an abutment 142. The cup 138 is attached to the disc 126. Extending through the spring 140 is a rod 144. This rod has a head 146 within the cup. The rod 144 may be a part of or may be attached to the end of a cable. This cable will be secured to the brake lever at 127 as before. With this form of dashpot the restricted opening in the partition enables the device to prevent too rapid shifting. However, when the brake is used to check the speed of the vehicle the disc 126 is lifted and the spherical member may then cease to close the passage it controls and the dashpot no longer restricts the shifting of the gear ratio to low speed.

It will be understood that the spring device (not shown) within housing 93 may be said to be force limiting in that it limits the force mechanically applied to the housing 93 and consequently determines the force action on the piston of the dashpot. With the force thus predetermined and the opening in the piston fixed, the dashpot ensures a predetermined rate of shift.

I claim:

1. In a change speed transmission for vehicles an infinitely variable speed ratio changing mechanism, a governor operated member, movable mechanism operable to change the speed ratio in response to each increment of its movement, cam means therebetween operably connected to said governor operated member and said mechanism.

2. In a change speed transmission for vehicles, a governor operated member, mechanism to change the speed ratio, cam means therebetween operably connected to said governor operated member and said mechanism, said cam means comprising a swinging member operably connected to and for movement by said governor operated member, a lever pivoted to said swinging member at a pivot removed from its fulcrum, said lever being connected to said mechanism, said operable connection between the swinging member and the governor operated member including a cammed slot whereby the rate of movement of the lever by the governor operated member is determined.

3. In a change speed transmission for vehicles, a governor operated member, mechanism to change the speed ratio, cam means therebetween operably connected to said governor operated member and said mechanism, said cam means comprising a swinging member operably connected to and for movement by said governor operated member, a lever pivoted to said swinging member at a pivot removed from its fulcrum, said lever being connected to said mechanism, said operable connection between the swinging member and the governor operated member including a cammed slot whereby the rate of movement of the lever by the governor operated member is determined, said lever being a differential lever and manually operable means to rotate said lever about its pivot with the swinging member whereby manual change of ratio may be effected.

4. In a change speed transmission for vehicles, a governor operated member, mechanism to change the speed ratio, cam means therebetween operably connected to said governor operated member and said mechanism said cam means comprising a swinging member operably connected to and for movement by said governor operated member, a lever pivoted to said swinging member at a pivot removed from its fulcrum, said lever being connected to said mechanism, said operable connection between the swinging member and the governor operated member including a cammed slot whereby the rate of movement of the lever by the governor operated member is determined, said lever being a differential lever, manually operable means to rotate said lever about its pivot with the swinging member whereby manual change of ratio may be effected, and another manually operable member to adjust the fulcrum of said lever.

5. For use with an infinitely variable transmission, means to shift the driving ratio, a dashpot to retard the rate of ratio changes, said dashpot comprising a cylinder, a piston having a spherical contour and means to tilt said piston to cut out the dashpot resistance to ratio changing.

6. For use with an infinitely variable transmission, means to shift the driving ratio, a dashpot to retard the rate of change, said dashpot comprising a pivoted casing, a reciprocable piston therein having a spherical contour, means to change the axis of the dashpot relative to the axis of the piston, lever means operably connected to said means for changing the driving ratio and to said piston whereby the piston is reciprocated.

WINFIELD D. GOVE.